US011146965B2

(12) United States Patent
Deviprasad et al.

(10) Patent No.: US 11,146,965 B2
(45) Date of Patent: *Oct. 12, 2021

(54) ARCHITECTURE FOR NETWORK SLICE DEPLOYMENT BASED ON NETWORK RESOURCE UTILIZATION

(71) Applicant: Verizon Patent and Licensing Inc., Arlington, VA (US)

(72) Inventors: Prasad Deviprasad, Cary, NC (US); Ravi Potluri, Coppell, TX (US); Kalyani Bogineni, Hillsborough, NJ (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,444

(22) Filed: Jan. 15, 2020

(65) Prior Publication Data
US 2020/0154280 A1       May 14, 2020

Related U.S. Application Data

(63) Continuation of application No. 15/830,283, filed on Dec. 4, 2017, now Pat. No. 10,582,393.

(51) Int. Cl.
| | |
|---|---|
| *H04W 16/10* | (2009.01) |
| *H04L 12/24* | (2006.01) |
| *H04L 12/911* | (2013.01) |
| *H04L 12/26* | (2006.01) |

(52) U.S. Cl.
CPC ............ *H04W 16/10* (2013.01); *H04L 41/04* (2013.01); *H04L 41/0806* (2013.01); *H04L 41/0853* (2013.01); *H04L 41/5051* (2013.01); *H04L 43/0817* (2013.01); *H04L 47/70* (2013.01)

(58) Field of Classification Search
CPC .... H04W 16/10; H04L 41/04; H04L 41/0806; H04L 41/0853; H04L 41/5051; H04L 43/0817; H04L 47/70
See application file for complete search history.

(56) References Cited

U.S. PATENT DOCUMENTS

| 10,582,393 | B2 * | 3/2020 | Deviprasad | ............ H04L 47/70 |
| 10,708,143 | B2 * | 7/2020 | Zhang | ...................... H04L 41/12 |
| 10,856,183 | B2 * | 12/2020 | Senarath | ............... H04W 24/02 |
| 2005/0259589 | A1 | 11/2005 | Rozmovits et al. | |

(Continued)

*Primary Examiner* — Donald L Mills

(57) ABSTRACT

A method, a device, and a non-transitory storage medium are described in which a network slice deployment service is described. The network slice deployment service includes storing network resource and capability information that indicates available network resources in a network. Network level requirement information pertaining to a request for network service from a user is generated. The network level requirement information is used to select available network resources based on the network resource capability information. The network slice deployment service calculates network resource utilization associated with available network resources so that optimal usage of network resources can be selected and end-to-end network slice deployment layout information can be generated and used to provision a network slice deployment layout that supports the request for network service.

20 Claims, 12 Drawing Sheets

(56) References Cited

U.S. PATENT DOCUMENTS

| | | |
|---|---|---|
| 2011/0145657 A1 | 6/2011 | Bishop et al. |
| 2012/0092997 A1 | 4/2012 | Mihaly et al. |
| 2014/0279201 A1 | 9/2014 | Iyoob et al. |
| 2018/0077024 A1 | 3/2018 | Zhang |
| 2018/0132138 A1 | 5/2018 | Senarath et al. |
| 2018/0316564 A1 | 11/2018 | Senarath |
| 2018/0317134 A1 | 11/2018 | Leroux et al. |
| 2018/0332485 A1 | 11/2018 | Senarath et al. |
| 2019/0021010 A1 | 1/2019 | Senarath et al. |
| 2019/0109768 A1* | 4/2019 | Senarath ............. H04L 41/0681 |
| 2019/0158364 A1* | 5/2019 | Zhang ................ H04L 41/5054 |

* cited by examiner

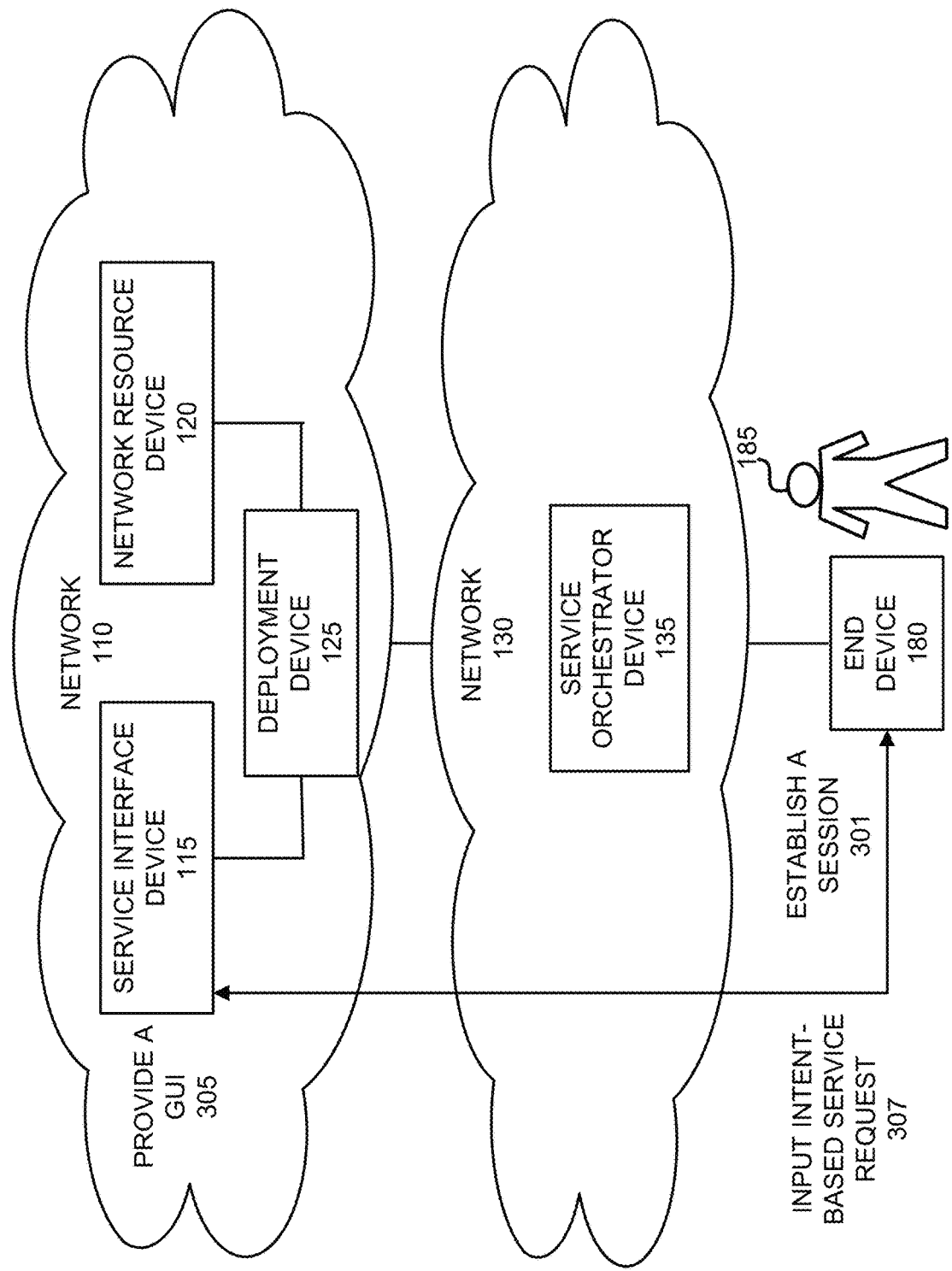

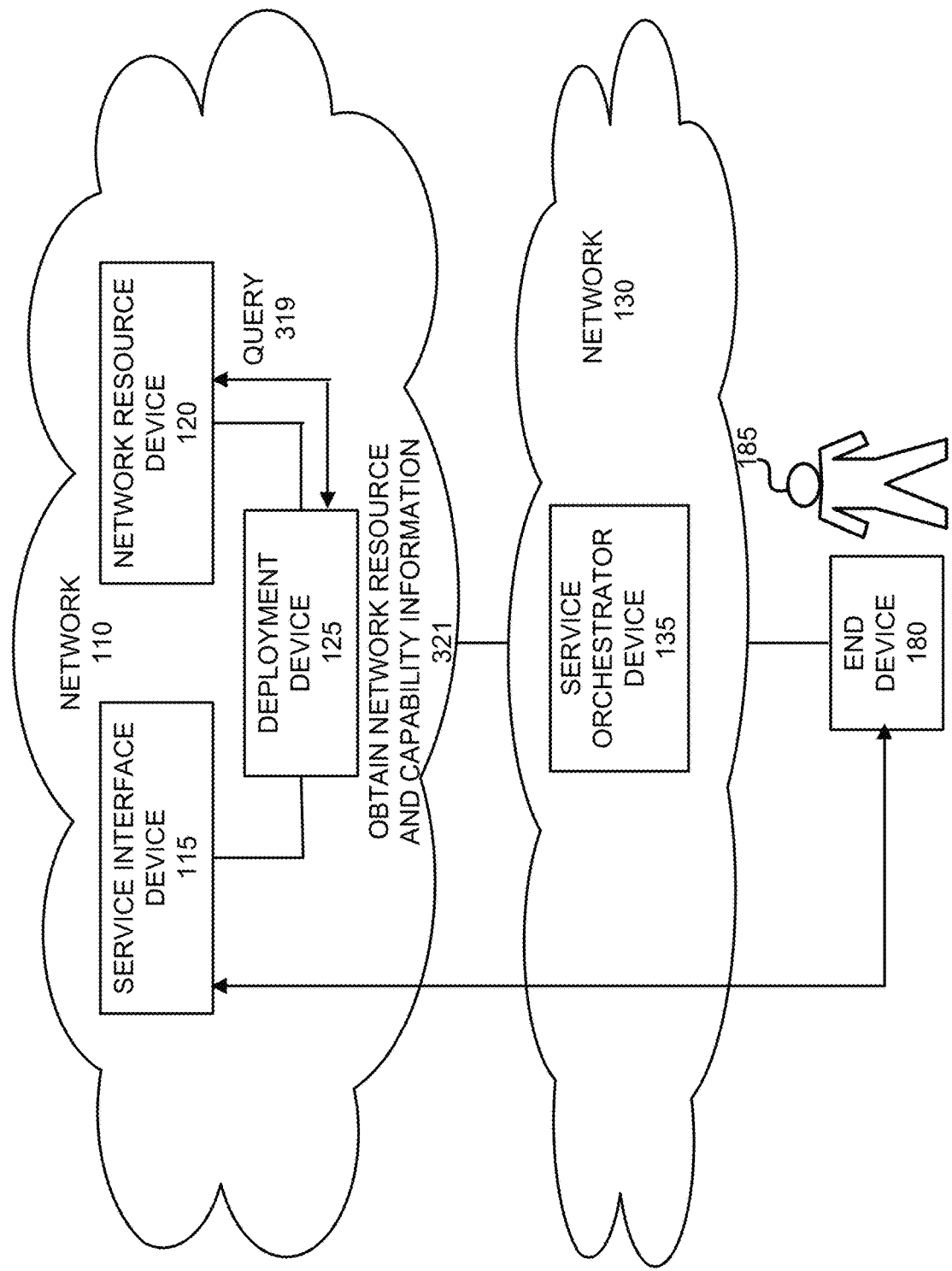

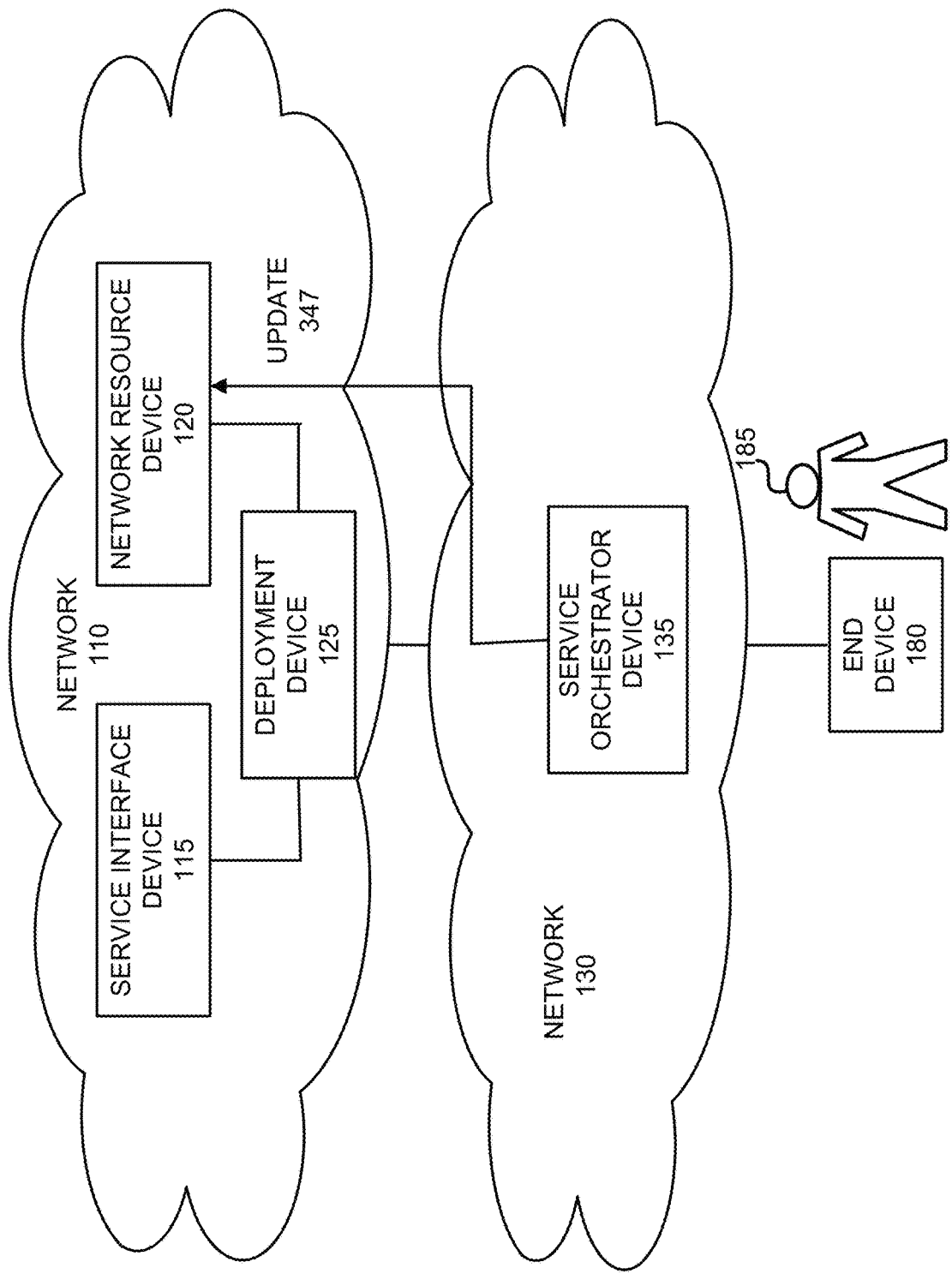

ARCHITECTURE FOR NETWORK SLICE DEPLOYMENT BASED ON NETWORK RESOURCE UTILIZATION

CROSS REFERENCE TO RELATED APPLICATION

This patent application is a continuation of U.S. patent application Ser. No. 15/830,283, filed on Dec. 4, 2017, the disclosure of which is hereby incorporated herein by reference in its entirety.

BACKGROUND

The development and design of next generation wireless networks (e.g., Fifth Generation (5G) networks) is currently underway by various organizations, service providers, and so forth. For example, the development and design of next generation wireless networks may be based on cloud technologies, software defined networking (SDN), and network function virtualization (NFV).

BRIEF DESCRIPTION OF THE DRAWINGS

FIGS. 3A-3H are diagrams illustrating an exemplary processes of an exemplary embodiment of the network slice deployment service;

DETAILED DESCRIPTION OF PREFERRED EMBODIMENTS

Figure 1:
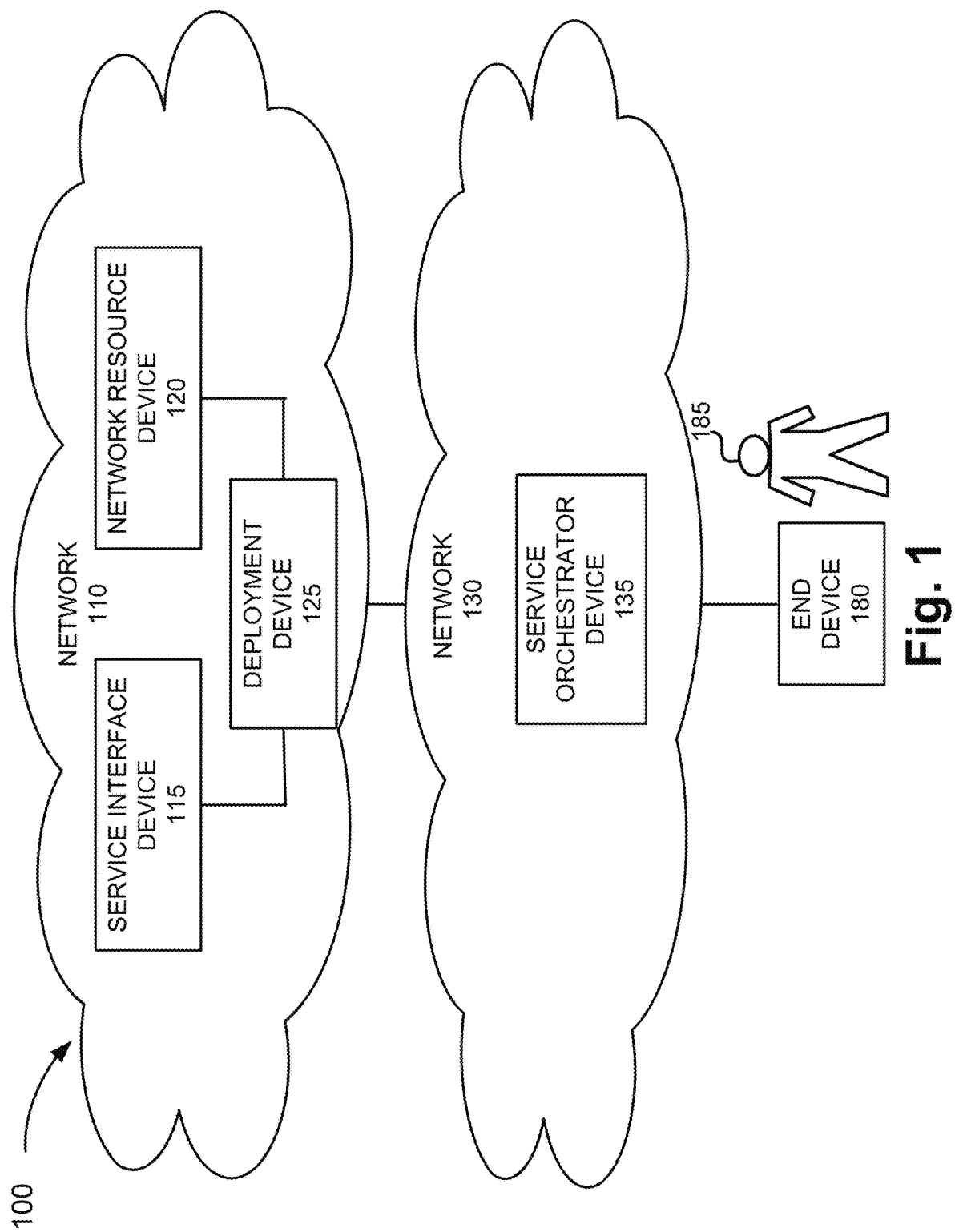
FIG. 1 is a diagram illustrating an exemplary environment in which an exemplary embodiment of a network slice deployment service may be implemented.

The following detailed description refers to the accompanying drawings. The same reference numbers in different drawings may identify the same or similar elements. Also, the following detailed description does not limit the invention.

A future network should support various use cases, meet various performance metrics, allow for scalability and flexibility, and may be implemented based on SDN and NFV in an integrated fashion. Ubiquitous automation, network slicing, closed loop service assurance, self-healing, and other network attributes and/or services may be integral aspects of the future network. For example, network slicing services of the future network may create and dynamically manage functionally isolated networks (e.g., virtualized, logical, physical, etc.). A future network may include a radio access network (RAN), a core network, a service or application layer network, a cloud network, and so forth. The future network may also include networks of diverse technologies (e.g., Fourth Generation (4G) wireless, Fifth Generation (5G) wireless, optical, Long Term Evolution (LTE) core network, etc.). Network slicing may be implemented based on cloud technologies, SDN, NFV, network orchestration, OpenFlow, etc., and network slices may be configured to meet specific applications, services, and end devices demands. For example, a network slice may be expected to meet certain reliability, latency, bandwidth, and/or other quality-of-service (QoS) requirement. Consequently, the provisioning of the future network to satisfy network slicing requirements can be challenging. Currently, there are no mechanisms that can dynamically create and manage network slices and the associated requirements of the future network.

According to exemplary embodiments, a network slice management system provides a network slice deployment service, as described. According to an exemplary embodiment, the network slice management system includes a deployment device and an inventory device. According to various exemplary embodiments, the type of network resources may vary. For example, the network resources may include physical network resources, virtual network resources, and/or logical network resources which may pertain to various types of networks, network devices, and/or links. By way of further example, network resources may pertain to a RAN, a core network, a cloud network, a data center, an application layer network, a virtual network, a fronthaul network, a backhaul network, an SDN network, and/or a transport network. The network resource may pertain to various types of network devices included in the network, and/or various types of communication links. For example, the various types of communication links may include point-to-point, service-based, wireless, wired, optical, intra-network, inter-network, fronthaul link, backhaul link, primary, secondary, backbone link, and/or other attributes of the communication link. The capability information may indicate available capacities pertaining to the network resource. For example, depending on the type of network resource, the capacity of the network resource may include bandwidth, processing power, storage capacity, QoS (e.g., latency, throughput, etc.), protocol supported, and/or other attributes (e.g., applications, services, etc.).

According to an exemplary embodiment, the deployment device may calculate a cost associated with one or multiple candidate network slice deployment layouts based on cost information, the information included in the inventory device, and a service request. According to an exemplary embodiment, the cost information may include an end-to-end cost, as described herein. According to an exemplary embodiment, the cost information may include other costs pertaining to a business value (e.g., operational cost, maintenance cost, etc.), as described herein.

As a result, the network slice deployment service may minimize the cost associated with a network slice while meeting the requirements of an application or a service to which the network slice is configured to support in view of the service request.

FIG. 1 is a diagram illustrating an exemplary environment 100 in which an exemplary embodiment of a network slice deployment service may be implemented. As illustrated, environment 100 includes a network 110 and a network 130. Network 110 may include a service interface device 115, a network resource device 120, and a deployment device 125. Network 130 may include a service orchestrator device 135. As further illustrated, environment 100 includes an end device 180, which is operated by a user 185.

According to other embodiments, environment 100 may include additional devices, fewer devices, and/or different types of devices than those illustrated and described herein. For example, a function of a single network device may be implemented by multiple devices, and/or functions of multiple network devices may be implemented by a single network device. In this regard, the number, type, and/or arrangement of network devices (also known as network elements or network functions) in network 110, in network 130, and end device 180 are exemplary. A network device, a network element, or a network function (referred to herein simply as a network device) may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). According to other exemplary embodiments, environment 100 may include additional networks, fewer networks, and/or different networks than those illustrated and described herein.

Environment 100 includes communication links between the network devices and between end device 180 and network 110. Environment 100 may be implemented to include wired, optical, and/or wireless communication links among the devices illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Network 110 includes one or multiple networks of one or multiple types and technologies that host the network slice deployment service, as described herein. For example, network 110 may be implemented to include the Internet, the World Wide Web, an Internet Protocol Multimedia Subsystem (IMS) network, a Rich Communication Service (RCS) network, a cloud network, a packet-switched network, a private network, a public network, an Internet Protocol (IP) network, an SDN network, a virtual network, a network that hosts an end user application or an end user service, or some combination thereof. For example, the end user application/ service network may provide various 5G applications/services pertaining to broadband access in dense areas (e.g., pervasive video, smart office, operator cloud services, video/ photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

According to an exemplary embodiment, service interface device 115 includes a network device comprising logic that provides an intent-based interface. The intent-based interface may be implemented as a graphical user interface in which a user (e.g., user 185) may interactively indicate a service request for use of network resources included in network 130. As an example, the graphical user interface may indicate a catalog of available network functions or services from which the user may select. Additionally, or alternatively, the graphical user interface may allow the user to express an intent using natural language and/or selectable terms, phraseologies, or statements.

According to an exemplary embodiment, service interface device 115 generates a service request based on the user's input. The service request may include natural language and/or a business/service description based on higher language constructs that declares the user's intent but does not designate the way for execution. The service request may include other parameters pertaining to the service requested, such as for example, a date, a time period, a location, a price, and/or other criteria that may specify the service requested. The service request may be non-prescriptive with respect to detailed provider implementation, and independent of provider implementation and operational policies.

According to an exemplary implementation, service interface device 115 includes logic that comprises an intent expression model. For example, the intent expression model may include an expression that indicates what the user wants to do, or an expression that indicates an expected final state or service state to be produced and maintained. The intent expression model may include an object or an element that indicates a network resource and service in the network (e.g., a node, a connection, a service flow, etc.).

According to an exemplary embodiment, service interface device 115 includes logic that translates the service request, which may be an intent-based service request, to network level requirement information. For example, service interface device 115 may include logic that uses mapping lookups to translate and/or resolve the service request into prescriptive information. The prescriptive information may include provider-specific information that relate to a provider's system architecture. For example, the prescriptive information may include parameters and parameter values pertaining to a service and/or network resources. The prescriptive information may be translated relative to one or multiple technologies (e.g., 4G, 5G, etc.). The prescriptive information may be used by deployment device 125 to generate a candidate network slice deployment, as described herein. The prescriptive information may also be used by other network devices in environment 100 (e.g., service orchestrator device 135, network devices in a RAN and core network of network 130, etc.).

According to an exemplary embodiment, service interface device 115 includes logic that communicates prescriptive information pertaining to the service request to deployment device 125. According to an exemplary embodiment, service interface device 115 includes logic that provides a graphical user interface that indicates a service response, which is based on the service request, to the user. The service response may indicate one or multiple available network slice deployment options from which the user may select and/or accept before a candidate network slice deployment is provisioned (e.g., by service orchestrator device 135) to satisfy the user's service request.

According to other exemplary embodiments, service interface device 115 includes a network device comprising logic that provides a non-intent-based interface. For example, the non-intent-based interface may be implemented as a graphical user interface in which the user may specify a service request. The service request may include prescriptive information. For example, the prescriptive information may indicate various parameters such as, for example, type of service (e.g., video streaming, Internet access, etc.), amount of bandwidth, level of reliability, latency, redundancy, priority, type of network, and/or other network-level requirement information.

According to an exemplary embodiment, network resource device 120 includes a network device comprising logic that manages network resource and capability information. For example, the network resource and capability information may indicate an inventory of physical, logical, and virtual network resources associated with a RAN, a core network, a data center, a transport network, links between network devices, and other forms of network resources that are currently available in network 130. The network resource and capability information may indicate the capabilities of available network resources in terms of storage, computation, bandwidth, latency, and so forth. The network resource and capability information may correlate the inventory to location information and date and time information.

According to an exemplary implementation, network resource device 120 may include a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). Network resource device 120 may include a storage device that stores a database. Network resource device 120 may include logic that stores network resource and capability information, and performs other storage-related functions, such as, deletes, additions, updates, searches or lookups, etc., pertaining to the network resource and capability information in support of the network slice deployment service. Also, network resource device 120 may include a communication interface that provides for the transmission and/or reception of information that supports the network slice deployment service. For example, network resource device 120 may communicate with deployment device 125, service orchestrator device 135, and/or other network devices described in environment 100.

According to an exemplary embodiment, deployment device 125 includes a network device comprising logic calculates a candidate network slice deployment layout that satisfies the network level requirements of a service request. According to an exemplary embodiment, deployment device 125 uses the network resource and capability information and service request requirements as a basis to calculate the candidate network slice deployment layout. According to an exemplary embodiment, deployment device 125 includes logic that calculates a cost associated with a candidate network resource and/or a candidate network slice deployment layout, which is used as a basis to optimally use available network resources, as described herein. Deployment device 125 may generate network slice deployment layout descriptors corresponding to a network slice deployment layout selected to fulfill the service request. Deployment device 125 may provide the network slice deployment layout descriptors to service orchestrator device 135 for use and/or execution in the provisioning of the network slice deployment layout pertaining to the service request.

Network 130 includes one or multiple networks of one or multiple types. For example, network 130 may be implemented to include a terrestrial wireless network. According to an exemplary embodiment, network 130 may include a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), and/or a future or next generation RAN (e.g., a Fifth Generation (5G)-access network (5G-AN) or a 5G-RAN). According to other exemplary embodiments, network 130 may include a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or type of public land mobile network (PLMN).

Network 130 may also include other types of networks, such as a WiFi network, a Worldwide Interoperability for Microwave Access (WiMAX) network, a local area network (LAN), a personal area network (PAN), or other type of network that provides access to or can be used as an on-ramp to network 110. Depending on the implementation, network 130 may include various types of wireless network devices, such as, for example, a base station (BS), a base transceiver station (BTS), a Node B, an evolved Node B (eNB), a next generation Node B (gNB), a remote radio head (RRH), an RRH and a baseband unit (BBU), a BBU, a radio network controller (RNC), a wireless node (e.g., a small cell node (e.g., a picocell device, a femtocell device, a microcell device, a home eNB, a repeater, etc.)), a radio unit, a roadside unit, a 5G wireless access node, or other type of wireless station that provides wireless access to network 110. According to various exemplary embodiments, network 130 may be implemented according to various architectures of wireless service, such as, for example, macrocell, microcell, femtocell, picocell, metrocell, non-cell, or other configuration. Additionally, according to various exemplary embodiments, network 130 may be implemented according to various wireless technologies, wireless standards, wireless frequencies/bands, and so forth.

Network 130 may further include a core network. For example, the core network may include a complementary network pertaining to the one or multiple RANs described. For example, the core network may include the core part of an LTE network, an LTE-A network, a CDMA network, a GSM network, and so forth. Depending on the implementation, the core network may include various network devices, such as, for example, a gateway device, a support node, a serving node, a mobility management entity (MME), a session management function (SMF), a core access and mobility management function (AMF), as well other network devices that provide various network-related functions and/or services, such as charging and billing, security, authentication and authorization, network policy enforcement, management of subscriber profiles, and/or other functions and/or services that facilitate the operation of the core network.

Additionally, for example, network 130 may include one or multiple data centers, transport networks, optical networks, wired networks, data networks, application layer or service layer networks, streaming networks, Multimedia Broadcast and Multicast Service (MBMS) networks, cloud networks, enterprise networks, and/or other types of network resources. Network 130 may include network resources associated with one or multiple vendors, service providers, and/or other entities. Network 130 may include a network that hosts an end user application or an end user service.

According to an exemplary embodiment, service orchestrator device 135 includes a network device comprising logic that coordinates, authorizes, releases and/or engages network resources in network 130. According to an exemplary embodiment, service orchestrator device 135 obtains network slice deployment layout descriptors corresponding to a network slice deployment layout from deployment device 125. Service orchestrator device 135 may manage the provisioning of the network slice deployment layout to satisfy the service request. Service orchestrator device 135 may include various network elements, such as for example, a Network Functions Virtualization Orchestrator (NFVO), a Generic Virtual Network Function Manager (GVNFM), a Specialized Virtual Network Function Manager (SVNFM), a Virtual Infrastructure Manager (VIM), a Data Center SDN Controller, a Virtual Infrastructure Manager (VIM), a Slice Manager, Interfaces, Plug-ins, Workflows, Slice Templates, a Common Information Model (CIM), network forwarding graphs, and so forth. Service orchestrator device 135 may perform various functions such as, for example, network slice life cycle management, configuration management (e.g., policies, isolation of management), performance management (e.g., service level agreement (SLA) management, service assurance and programmability), service mapping, and so forth.

According to an exemplary embodiment, service orchestrator device 135 may include logic that updates network resource device 120 regarding availability of network resources based on the current state of network resources in network 130 and provisioned network resources that support service requests. In this way, the network resource and capability information may be updated in real-time to allow deployment device 125 to calculate and select a network slice deployment layout that optimizes the use of network resources based on cost, as described herein.

End device 180 includes a device that has computational and communication capabilities. For example, end device 180 may be implemented as a mobile device, a portable device, or a stationary device. By way of further example, end device 180 may be implemented as a computer (e.g., a desktop, a laptop, a palmtop), a smartphone, a personal digital assistant, a tablet, a netbook, a phablet, or other type of user device. End device 180 includes software that that allows user 185 to access and use the network slice deployment service, as described herein. According to various exemplary implementations, end device 180 may include a web browser, a mobile application, or other type of client or agent software. User 185 may be a person that operates end device 180. For example, user 185 may be a network administrator that wishes to use the network slice deployment service.

As previously described, network resource device 120 may store network resource and capability information. According to an exemplary embodiment, the network resource and capability information indicates network resources that are available in network 130 and their corresponding capabilities. According to various exemplary embodiments, the type of network resources and capabilities may vary, as previously described. For the sake of description, exemplary network resource and capability information is described below. The network resource and capability information may pertain to an end-to-end view of the network topology, which may include RAN resources, core network resources, data center, backhaul, fronthaul, and so forth, as previously described.

Figure 2:
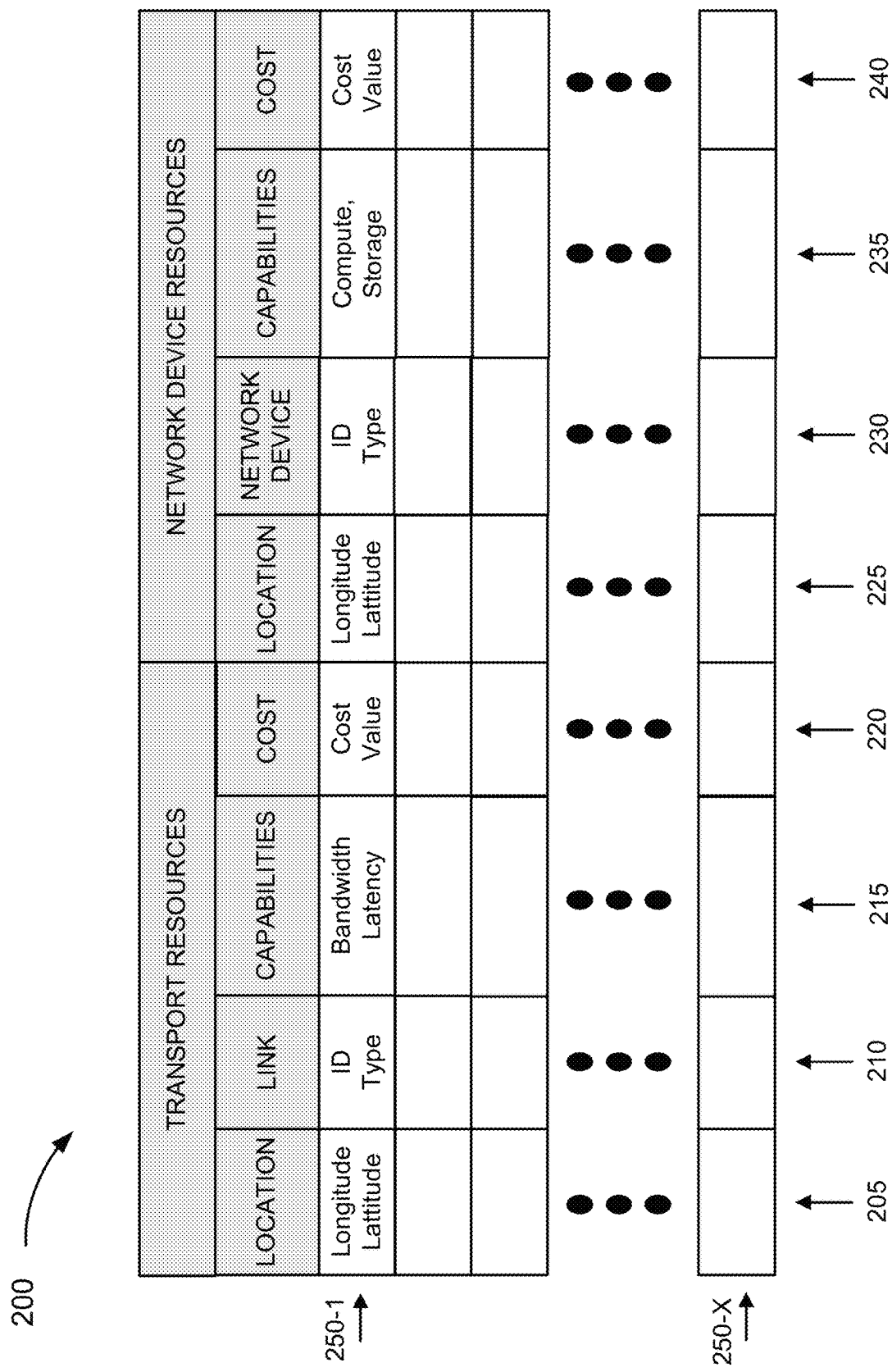
FIG. 2 is a diagram illustrating exemplary network inventory and capability information.

Referring to FIG. 2, exemplary network resource and capability information may be stored in a table 200 that includes a location field 205, a link field 210, a capabilities field 215, a cost field 220, a location field 225, a network device field 230, a capabilities field 235, and a cost field 240. As further illustrated, table 200 includes records 250-1 through 250-X that each includes a grouping of fields 205 through 240 that may be correlated.

Network resource and capability information is illustrated in tabular form merely for the sake of description. Network resource and capability information may be implemented in a data structure different from a table. According to other exemplary implementations, table 200 may store additional, fewer, and/or different instances of network resource and capability information in support of the network slice deployment service, as described herein. For example, according to other exemplary embodiments, the network resource and capability information may pertain to additional, different, and/or fewer types of network resources. The values illustrated and described for each field of the network resource and capability information are exemplary.

Location field 205 may store data indicating a location of the network resource identified in link field 210. According to various exemplary implementations, the data may include one or multiple instances of data indicative of a locale or geographic area, such as, for example, a service area name (e.g., Times Square, Fenway Park, Northeast Boston, etc.), a service area identifier (e.g., a numerical string, an alphanumeric string, etc.), a Tracking Area Code (TAC), a Global Positioning System (GPS) coordinate (e.g., latitude and longitude), or other geographic location (e.g., data indicating a state, a county, a city, a town, and/or a zip code, or portion thereof). According to various exemplary implementations, the size of the locale may vary.

Link field 210 may store data pertaining to a communication link. For example, link field 210 may indicate an identifier of the communication link and one or multiple attributes of the communication link (e.g., 5G wireless, fronthaul, primary, etc.). Link field 210 may indicate end-to-end network devices associated with the communication link (e.g., within RAN, inter data centers, etc.).

Capabilities field 215 may store data indicating capabilities pertaining to a communication link. For example, capabilities field 215 may indicate various current available values pertaining to bandwidth, throughput, latency, and other metrics associated with QoS information. Capabilities field 215 may also store date and time information.

Cost field 220 may store data indicating a cost value pertaining to a communication link. The cost value is described further below.

Location field 225 may store data indicating a location of the network resource identified in network device field 230. For example, the data may include one or multiple instances of data indicative of a locale or geographic area, as described in relation to location field 205.

Network device field 230 may store data pertaining to a network device. For example, network device field 230 may indicate an identifier of the network device and one or multiple attributes of the network device (e.g., virtual, router, gNB, AMF, data center server).

Capabilities field 235 may store data indicating capabilities pertaining to a network device. For example, capabilities field 235 may indicate various current available values pertaining to processing power, memory, storage, communication interface (e.g., number of connections, etc.), and/or other attribute of the network device (e.g., protocol supported, technology of the network device (e.g., virtual machine (VM), container, 4G, 5G, etc.), available application, service, application program interface (API), etc.).

Cost field 240 may store data indicating a cost value pertaining to a network device. The cost value is described further below.

As previously described, according to an exemplary embodiment, deployment device 125 includes logic that calculates a cost associated with a candidate network resource and/or a candidate network slice deployment layout. For example, according to various exemplary implementations, deployment device 125 may calculate a cost value pertaining to a network resource (e.g., evolved Node B (eNB)), a cost value pertaining to a portion of end-to-end network resources (e.g., a RAN cost including multiple eNBs/gNBs/communication links; a data center cost including a storage device, an application server, and communication links, etc.), and/or a cost value pertaining to the end-to-end network resources (e.g., all network resources provisioned to support a service request).

According to an exemplary implementation, a cost value pertaining to a network resource may be calculated based on the following exemplary expression:

$$C = P_{sliver} - F(x) \tag{1},$$

in which $P_{sliver}$ is a business value of the network resource. For example, $P_{sliver}$ may indicate a cost (e.g., a business value) associated with the service provided by the network resource, which may include operational cost and/or maintenance cost, as well as product margins. A temporal cost function may approximate a net profit value taken across the expected life of the sliver. F(x) may indicate a total resource utilization cost from end-to-end, as described further below. C may indicate a numerical value, which if positive, may indicate that the network slice is suitable as a candidate network slice.

According to exemplary implementation, a resource cost value pertaining to the end-to-end network resources may be calculated based on the following exemplary expression:

$$F(x) = F_{RAN\_CORE} + F_{DC} F_{INTER\_DC} \tag{2},$$

in which $F_{RAN\_CORE}$ indicates a cost pertaining to a RAN and a core network. For example, the $F_{RAN\_CORE}$ may be based on a cost pertaining to a network device included in the RAN and radio resources, and a cost pertaining to a network device included in a core network and a communication link. The $F_{RAN\_CORE}$ may include other parameters, such as for example, priority of the network slice. $F_{DC}$, $F_{INTER\_DC}$ indicate costs pertaining to a data center and network transport between data centers. F(x) may indicate a total resource utilization cost from end-to-end (e.g., network edge to and including an application/service). According to various exemplary embodiments, expression (2) may include additional, fewer, and/or different cost elements depending on the network resources associated with a candidate network slice from an end-to-end perspective. For example, according to an exemplary embodiment of expression (2), $F_{INTER\_DC}$ may be omitted, and/or an intermediary network or other transport resources (e.g., fronthaul, midhaul, backhaul network resources outside of the RAN, a core network, and/or a data center) may be considered. According to an exemplary implementation, cost of a data center may be calculated based on the following exemplary expression:

$$C_{DC} = \Sigma(DC_i) \cup (L_i) \tag{3},$$

in which $DC_i$ indicates a cost associated a network device included in a data center, and $L_i$ indicates a cost associated with intra data center network resources. For example, the cost indicated by $L_i$ may be associated with a communication link, a network device (e.g., a router, etc.). $C_{DC}$ may indicate the total cost of a data center. According to an exemplary implementation the cost of the data center of a network device included in the data center may based on the following exemplary expression:

$$F_{DC} = \Sigma\{K_i(C_i) + L_i(S_i) M_i(N_i)\} \tag{4},$$

in which $K_i(C_i)$ indicates a computational cost of using $C_i$ compute at the $i^{th}$ data center, $S_i(C_i)$ indicates a storage cost of using $S_i$ storage at the $i^{th}$ data center, and $M_i(N_i)$ indicates the intra-data center networking costs of using $N_i$ network resources. The cost of network resources (e.g., computational, storage, etc.) may not be a linear function but may vary across data center locations depending on operational expenditures (OPEX) and capital expenditures (CAPEX) to maintain these network resources. Additionally, for example, a cost pertaining to various virtual network resources (e.g., a VNF, a virtual machine (VM), a container, etc.) may vary in terms of redundancy requirements, control plane requirements, and data plane requirements. By way of further example, a container-based virtual network device may be control plane heavy, while a VM-based virtual network device may be data plane heavy. Additionally, for example, cost may include other network-related requirements pertaining to QoS, traffic shaping, service level agreement (SLA), and other provisioning considerations (e.g., license utilization/expense pertaining to a network resource, etc.).

$$K_i = \delta K_i / \delta flap \tag{5},$$

in which $K_i$ indicates a marginal computational cost. For example, $\delta K_i$ may indicate the delta of total computational cost, and $\delta flap$ may indicate the delta of total compute power. Similarly, $L_i$ and $M_i$ may indicate marginal storage and networking costs using the cost and capacity of storage devices and network devices, respectively.

The cost indicated by $F_{INTER\_DC}$, which pertains to network transport between data centers, may be cost associated with inter-data center network resources (e.g., a communication link, a network device, etc.). For example, the inter-data center cost may be calculated based on the following exemplary expression:

$$N_{ij} = \text{Cost of link between} \{\text{Data center} i, \text{Data Center} j\} \tag{6},$$

$$F_{INTER\_DC} = \Sigma N_{ij} \tag{7},$$

in which $N_{ij}$ indicates the cost of inter-data center network resources between an $i^{th}$ data center and a $j^{th}$ data center. $F_{INTER\_DC}$ may indicate a cost associated with a summation of one or multiple $N_{ij}$ (e.g., between source and destination data centers). Deployment device 125 may store one or multiple costs pertaining to network resources in fields 220 and 240.

Figure 3B:
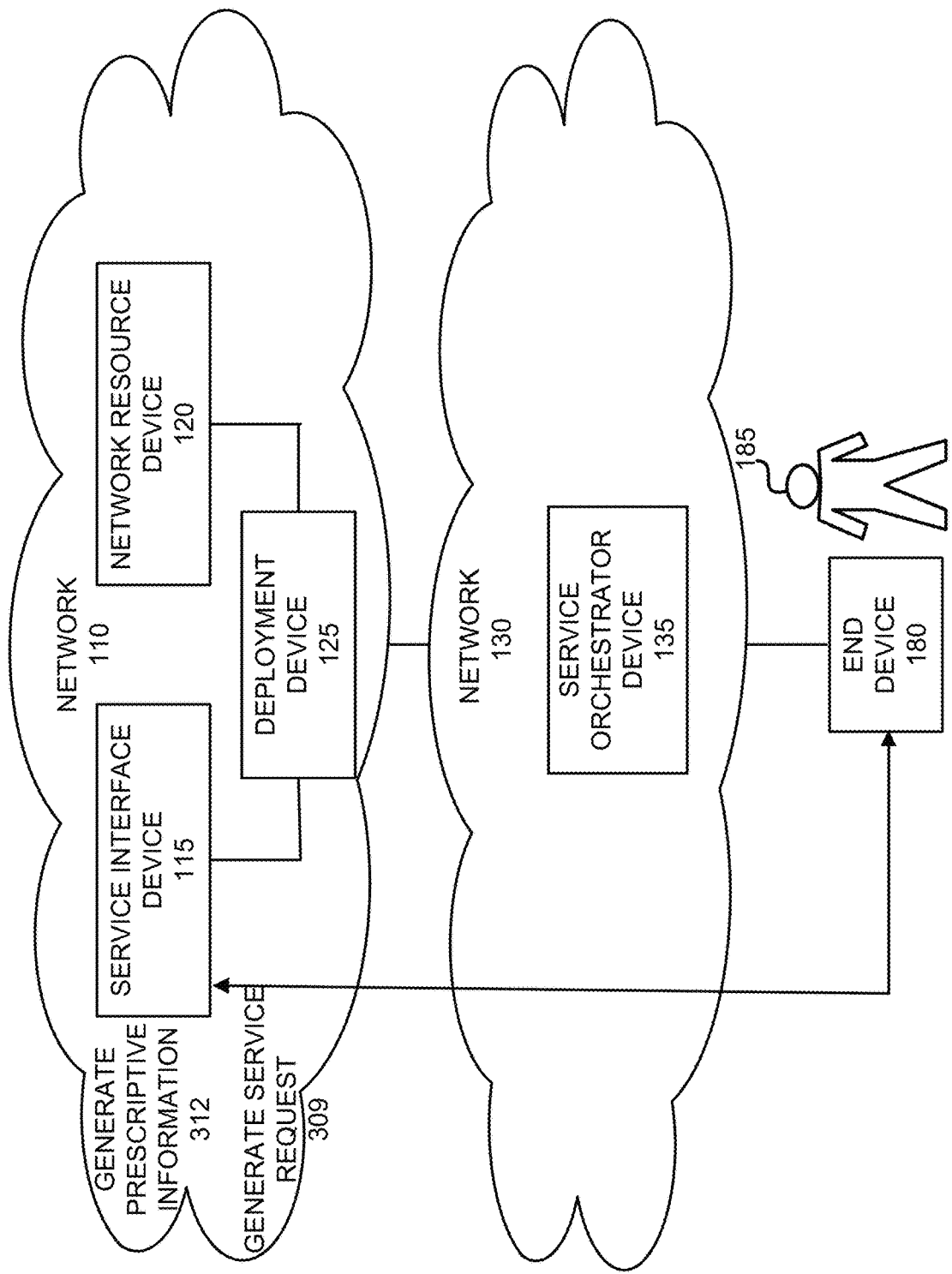

FIGS. 3A-3H are diagrams illustrating an exemplary process of the network slice deployment service according to an exemplary scenario. Referring to FIG. 3A, assume that user 185 (e.g., an accounts manager associated with an enterprise) wishes to obtain network service. User 185 establishes a session 301 via end device 180 with service interface device 115. User 185 may log into service interface device 115 to access the network slice deployment service. Upon successful login, service interface device 115 may provide a graphical user interface 305 that allows user 185 to provide an intent-based service request. For example, the graphical user interface may indicate a catalog of available network functions/services/applications from which user 185 may select. In response, user 185 inputs an intent-based service request 307.

Referring to FIG. 3B, in response to receiving the input, service interface device 115 generates a service request 309 based on the user input. For example, service request 309 may include information indicating a business/service description that declares the intent of user 185 based on the input and the catalog. Service interface device 115 translates the service request and generates prescriptive information 312. For example, the prescriptive information may include parameters, parameter values, and/or other network level requirement information pertaining to a network service corresponding to the service request. By way of further example, the prescriptive information may indicate reliability (e.g., redundancy or not, where redundancy is needed (e.g., core network, RAN, or both, cloud, etc.)), latency, bandwidth, bitrate, throughput, and/or other requirements (e.g., SLA metrics, etc.). The prescriptive information may also include other information, such as, for example, the number of end devices or end device density to be supported under the service request, traffic distribution (e.g., end device to semi-core and core network, etc.), connection percentage success rate, and/or other information indicative of the service request (e.g., key performance indicators (KPIs), etc.). The prescriptive information may include different sets of the prescriptive information based on different technologies. For example, the prescriptive information indicative of the requested network service provisioned via a 5G network may be different compared to the prescriptive information indicative of the requested network service provisioned via a 4G network and/or other network technology.

Figure 3C:
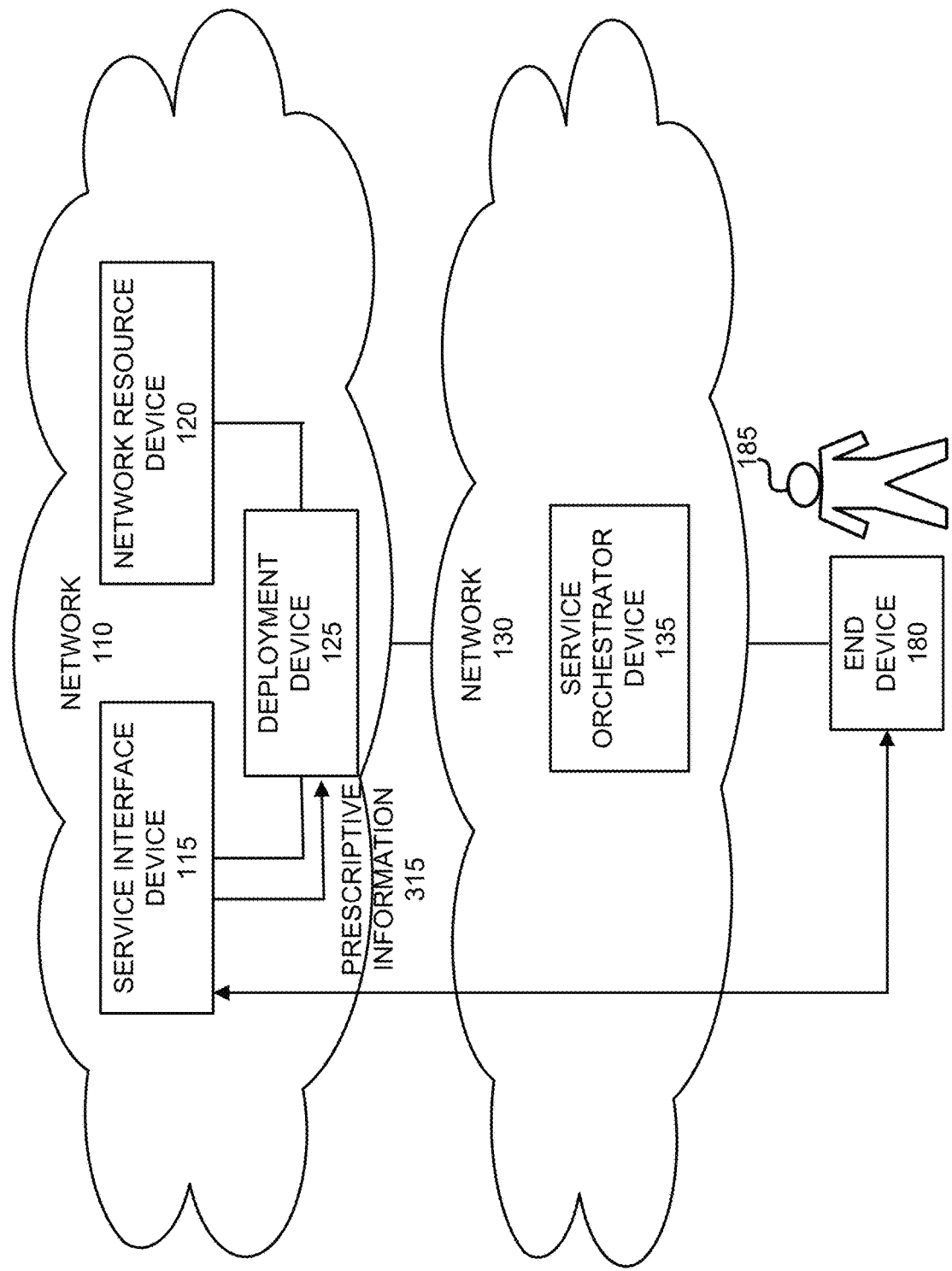

Referring to FIG. 3C, service interface device 115 provides the prescriptive information 315 to deployment device 125. Referring to FIG. 3D, in response to receiving the prescriptive information, deployment device 125 queries 319 network resource device 120. For example, the query may include information pertaining to a location at which the network service is to be received, a date and a time period during which the network service is to be received, and prescriptive information indicative of the network service requested. The prescriptive information may pertain to multiple technologies, as previously described. Based on the query, deployment device 125 may access and/or obtain network resource and capability information that satisfies the query.

Figure 3E:
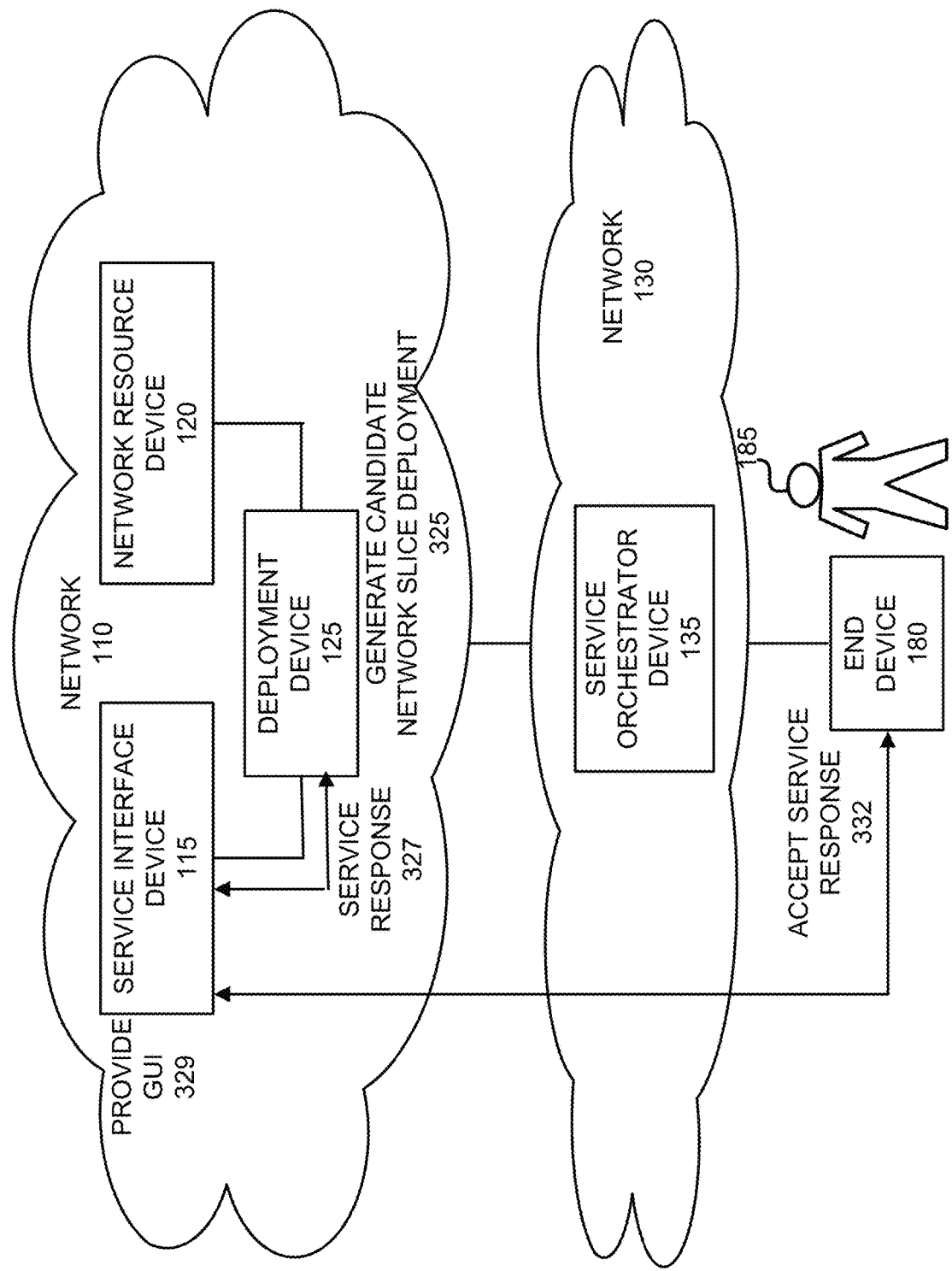

Referring to FIG. 3E, deployment device 125 may generate one or multiple candidate network slice deployment layouts 325. For example, deployment device 125 may calculate cost information pertaining to various candidate network resources (e.g., transport, network device, etc.) that are available and can satisfy the requirements of the service request. For example, as previously described, the cost information may include cost from an individual network resource basis (e.g., a network device, a communication link), from a group cost basis (e.g., a RAN, a data center, a core network, etc.), and/or from an end-to-end basis (e.g., from network edge to and including a destination device). The nature of the cost may indicate resource utilization, maintenance cost, operational cost, marginal cost, and/or other types of cost. Based on the calculation of cost information and available network resources, deployment device 125 may generate one or multiple candidate network slice deployment layouts that may optimally use the available network resources for satisfying the service request. According to various exemplary embodiments, the optimal usage may be from an end-to-end network perspective (e.g., from network edge to and including a destination network device), a network perspective (e.g., a RAN, a data center, etc.), and/or a network resource perspective (e.g., a network device of a data center, a communication link, etc.). According to an exemplary embodiment, deployment device 125 may rank multiple candidate network slice deployment layouts based on expression (1). According to another exemplary embodiment, when multiple candidate network slice deployment layouts are not generated, a ranking process may be omitted. Deployment device 125 may select a candidate network slice deployment layout that yields the best or optimal value of C. Deployment device 125 may also select the candidate network slice deployment layout based on configured rules, policies, heuristics, and/or a learning algorithm.

According to an exemplary implementation, deployment device 125 may generate a service response 327, which includes information indicative of the candidate network slice deployment layout, and send the service response to service interface device 115. By way of example, the service response information may indicate a monetary cost associated with a candidate network slice deployment layout, quality-of-service values associated with the candidate network slice deployment layout (e.g., minimum value and/or maximum value pertaining to latency, bandwidth, reliability, etc.) and/or other information representative of the configuration and/or service (e.g., delivery technology (virtual network resource, non-virtual network resource, cloud, 5G RAN access, 4G RAN access, etc.)). In response to receiving the service response information, service interface device 115 may provide a graphical user interface 329. For example, when multiple candidate network slice deployment layouts are available, user 185 may select a candidate network slice deployment layout via the graphical user interface, and transmit an acceptance of the service response 332. In this way, user 185 may select his or her preferred layout based on the service response information provided. Additionally, or alternatively, user 185 may indicate an acceptance of the candidate network slice deployment layout. According to other exemplary implementations, steps 327, 329, and 332 may be omitted.

Figure 3F:
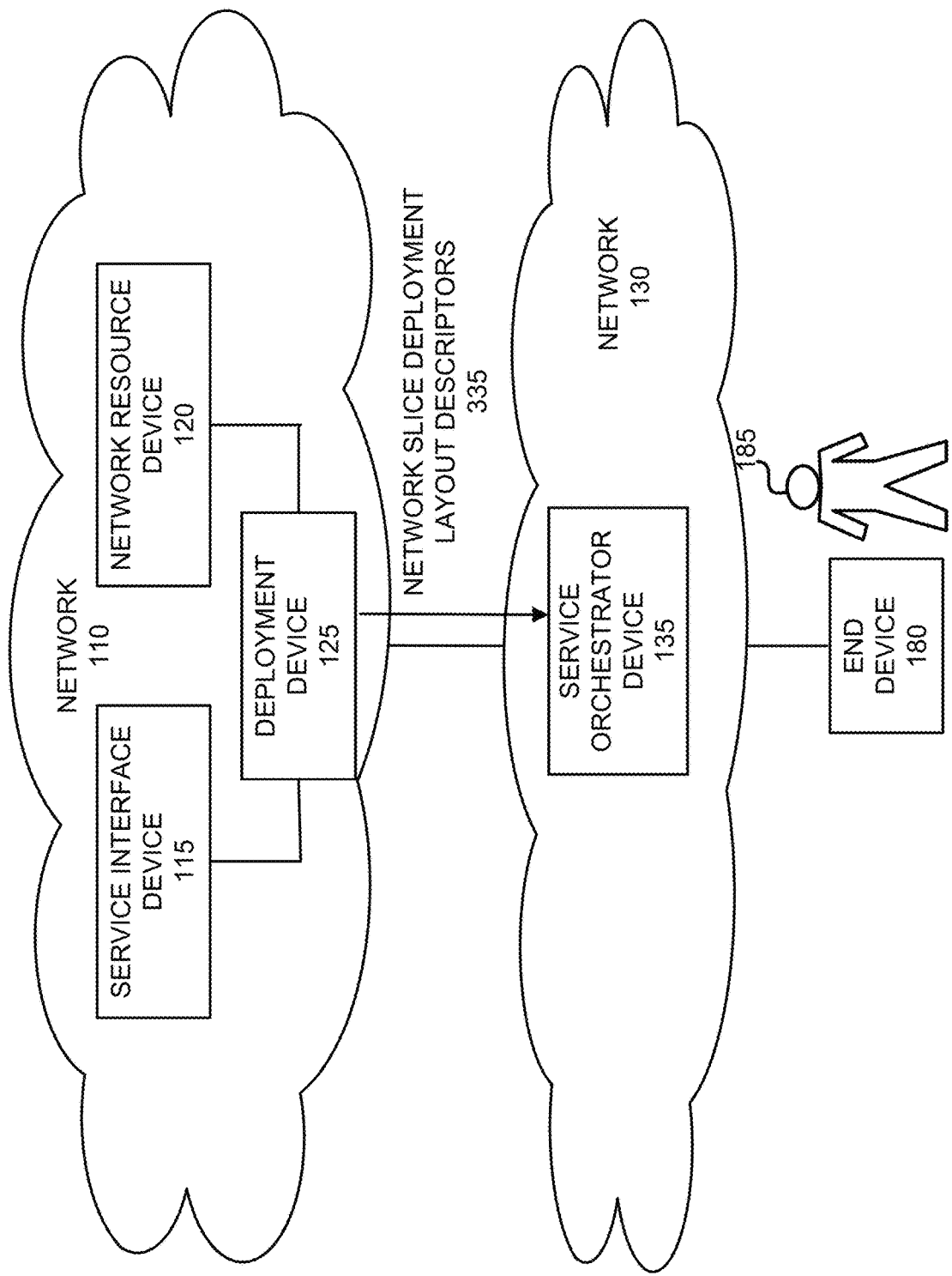

Referring to FIG. 3F, deployment device 125 may provide network slice deployment layout descriptors 335 to service orchestrator device 135. For example, the network slice deployment layout descriptors may include VNF descriptors, network service descriptors, and network slice descriptors. According to an exemplary implementations, one or more of the descriptors may be expressed in Topology and Orchestration Specification for Cloud Application (TOSCA) and derived from a CIM, and/or other well known language, data model, format, and so forth.

Figure 3G:
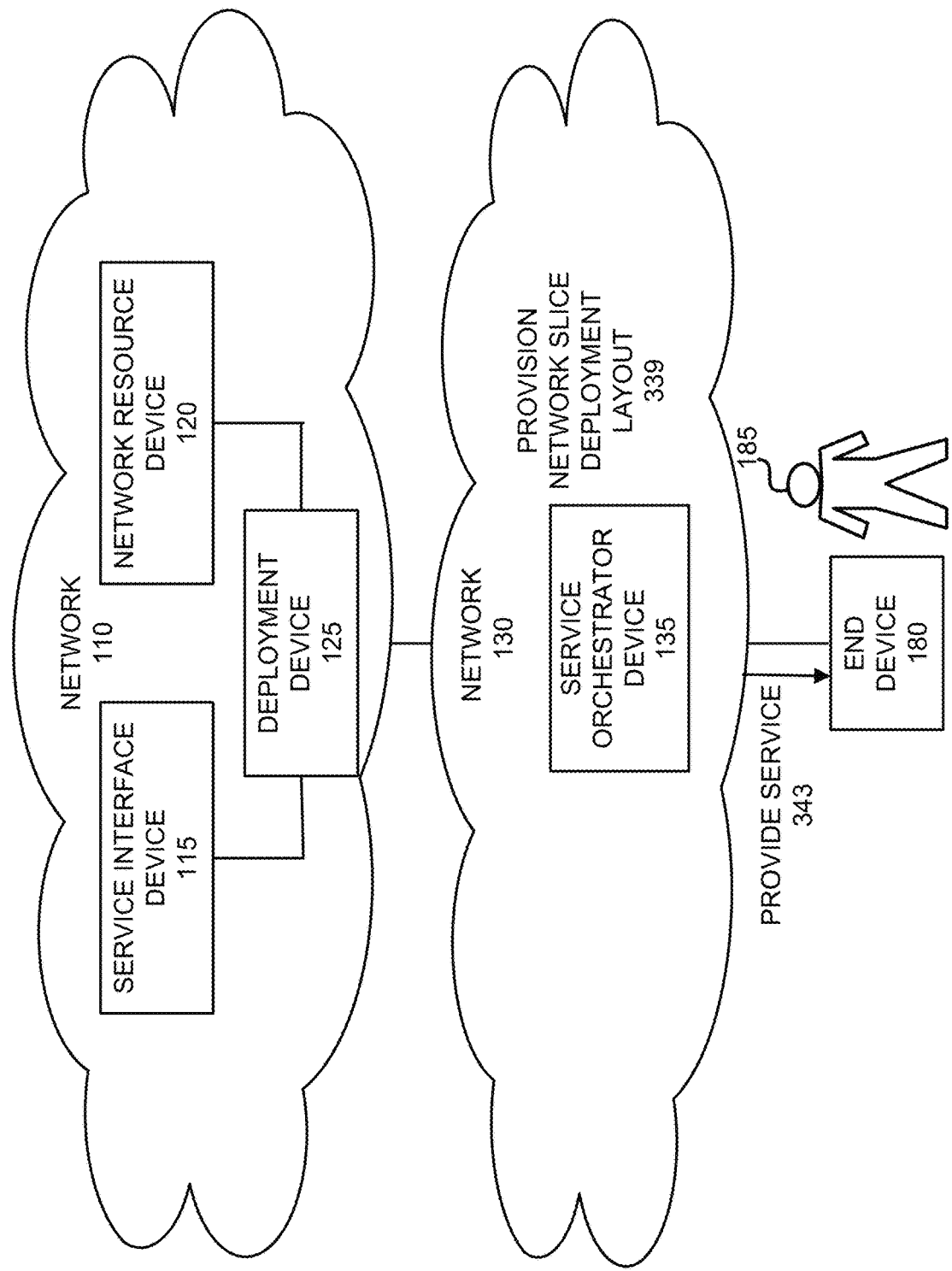

Referring to FIG. 3G, service orchestrator device 135 may provision the network slice deployment layout 339 based on the network slice deployment layout descriptors. The network slice deployment layout will provide end-to-end service in support of the network service requested. Subsequent to the provisioning of the network slice, network 130 may provide a network service 343 in accordance with the network service requested.

Referring to FIG. 3H, service orchestrator device 135 may update network resource device 120. For example, service orchestrator device 135 may transmit network resource and capability information to network resource device 120 that indicates the usage and/or availability of network resources in view of the provisioned network slice deployment layout.

Although FIGS. 3A-3H illustrate exemplary processes of the network slice deployment service, according to other exemplary embodiments, the process may include additional, different, and/or fewer steps, include additional, different, and/or fewer messages, and/or involve additional, different, and/or fewer network devices.

Figure 4:
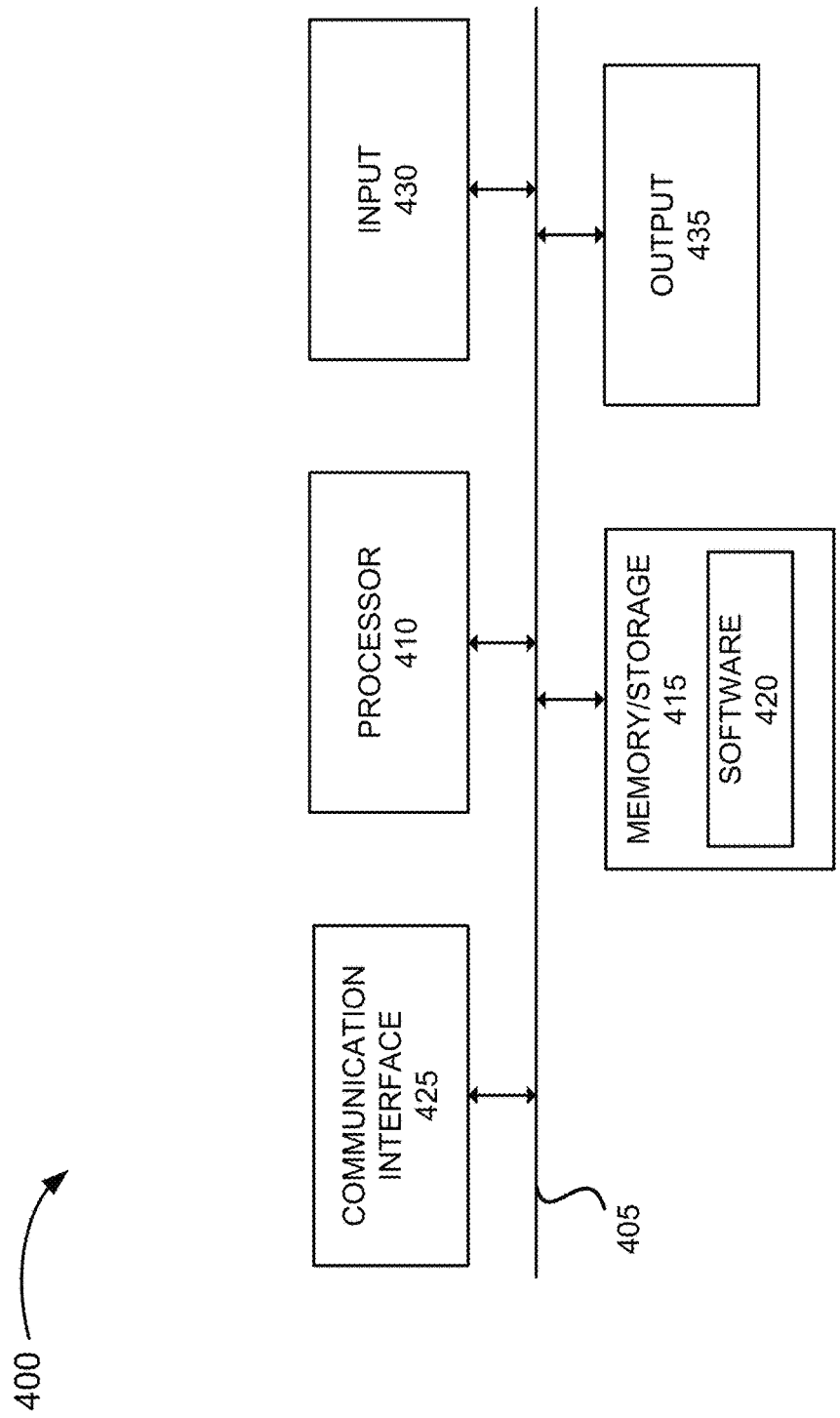
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in a network device of network 110, a network device of network 130, and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to network devices of network 110, software 420 may include an application that, when executed by processor 410, provides the functions of the network slice deployment service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
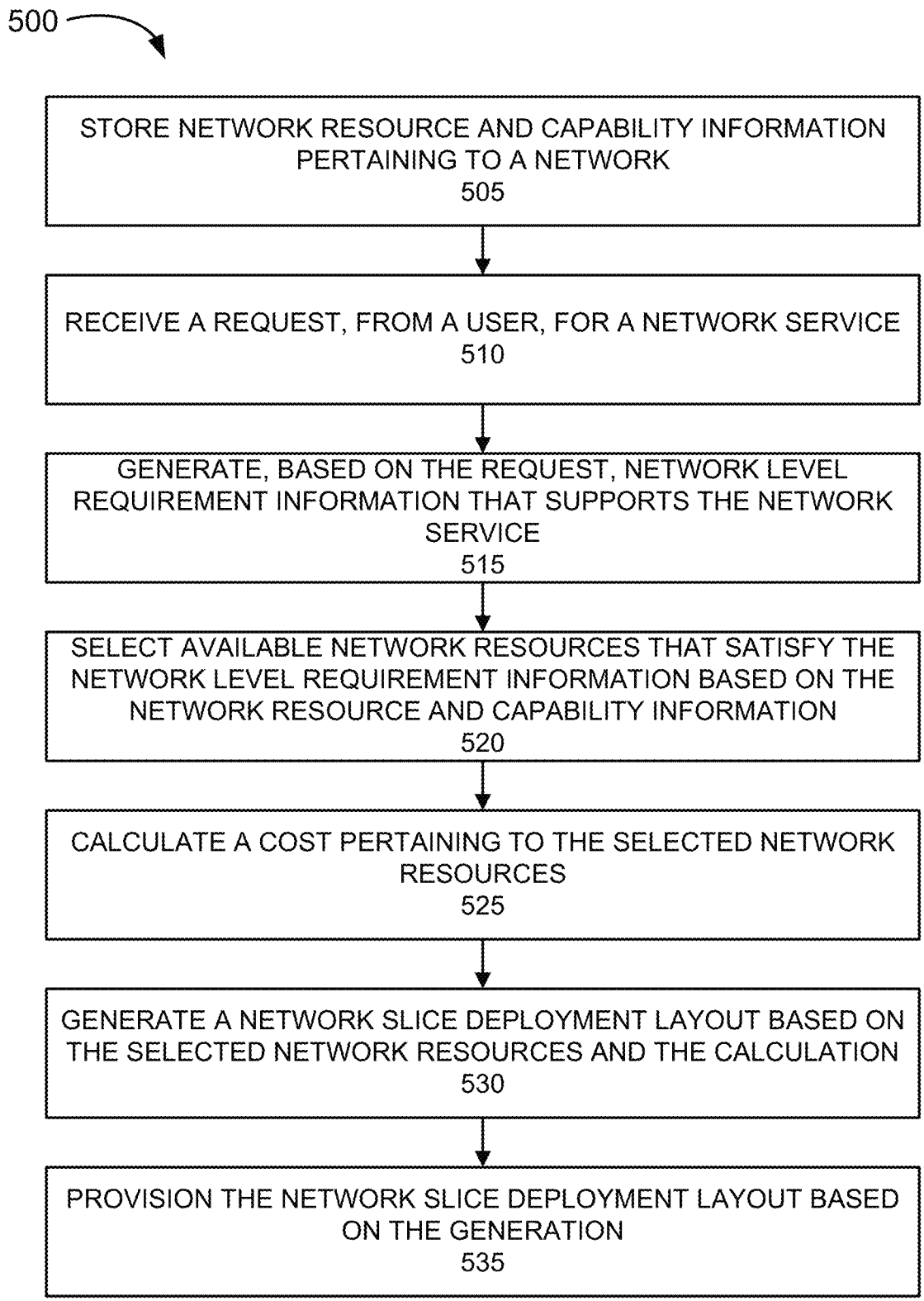
FIG. 5 is a flow diagram illustrating an exemplary updating process of an exemplary embodiment of the network slice deployment service.

FIG. 5 is a flow diagram illustrating an exemplary process 500 of an exemplary embodiment of the network slice deployment service. Process 500 is directed to a process previously described with respect to FIGS. 3A-3H, as well as elsewhere in this description, in which the network slice deployment service is provided. According to an exemplary embodiment, a network device of network 110 may perform a step of process 500. For example, processor 410 executes software 420 to perform the steps illustrated in FIG. 5, and described herein.

Referring to FIG. 5, in block 505, network resource and capability information pertaining to a network may be stored. For example, network resource device 120 may store network resource and capability information pertaining to network 130. By way of further example, the network resource and capability information may include information previously described in relation to FIG. 2.

In block 510, a request for a network service, from a user, may be received. For example, user 185 via end device 180 may establish a session with service interface device 115. User 185 may input, via a graphical user interface of service interface device 115, a request for a network service. According to various exemplary embodiments, the graphical user interface may be an intent-based interface or a non-intent-based interface.

In block 515, network level requirement information, which supports the network service, may be generated based on the request. For example, service interface device 115 may translate and/or resolve the request into prescriptive information, as previously described. Service interface device 115 may provide the prescriptive information to deployment device 125.

In block 520, available network resources, which satisfy the network requirement level requirement information, may be selected based on the network resource and capability information. For example, deployment device 125 may query network resource device 120 based on the prescriptive information. Deployment device 125 may select network resources (e.g., communication links, network devices, a RAN, a core network, a data center, etc.) that satisfy the prescriptive information and are available.

In block 525, a cost pertaining to the selected available network resources may be calculated. For example, deployment device 125 may calculate a cost associated with a network resource, a group of network resources, and/or an aggregate of end-to-end network resources, as previously described, based on the selected available network resources.

In block 530, a network slice deployment layout information may be generated based on the selected network resources and the calculation. For example, deployment device 125 may generate one or multiple candidate network slice deployment layouts based on the available network resources and the cost information. For example, depending on the network service requested, the network service may be deployment in a centralized manner or in a distributed manner. Depending on the number of locations of end users relative to the destination network device that provides the network service, transport costs may differ between a centralized-based network slice delivery layout compared to a distributed-based network slice delivery layout. Additionally, for example, for each type of layout (e.g., centralized, distributed, etc.), there may be multiple networks, routing within a network, data centers to use, and/or other network resources from which to select. However, as described herein, deployment device 125 may determine an optimal usage of network resources based on the cost information from an end-to-end network side perspective, a network perspective, and/or a network resource perspective. The candidate network slice deployment layout information may include virtual network function descriptor information, network service descriptor information, and network slice descriptor information.

In block 535, the network slice deployment layout may be provisioned based on the generation. For example, deployment device 125 may provide the candidate network slice deployment layout information to service orchestrator device 135. Service orchestrator device 135 may provision the network service based on the network slice deployment layout information.

Although FIG. 5 illustrates an exemplary process 500 of the network slice deployment service, according to other embodiments, process 500 may include additional operations, fewer operations, and/or different operations than those illustrated in FIG. 5, and described herein. For example, service orchestrator device 135 may update network resource device 120.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a network device, a request for a network service;
   selecting, by the network device, a portion of network resources of a network that would support the network service;
   calculating, by the network device, network resource information pertaining to the selected portion of network resources, wherein the network resource information indicates a cost to utilize the selected portion of network resources;
   generating, by the network device, end-to-end network slice deployment information that includes parameters to provision an end-to-end network slice deployment layout in the network that support the network service and cost values of a network slice service pertaining to an entity provisioning the network service; and
   transmitting, by the network device to an other network device, the end-to-end network slice deployment information.

2. The method of claim 1, wherein the cost values are generated based on at least one of operational costs or maintenance costs of the network slice service.

3. The method of claim 1, further comprising:
   storing, by the network device, network resource and capability information pertaining to network resources of the network and the network slice service.

4. The method of claim 3, wherein the network resource and capability information indicates network resources that are available for use, available capacities of the network resources including computational, storage, and transport, and locations of the available network resources, and wherein the network resources include network devices and communication links.

5. The method of claim 1, further comprising:
   generating, by the network device based on the request, network level requirement information that would support the network service.

6. The method of claim 5, further comprising:
   selecting, by the network device, one or more network resources from the portion of the network resources that use a least capacity based on the network resource information and the network level requirement information; and
   including, by the network device, parameters pertaining to the one or more network resources in the end-to-end network slice deployment information.

7. The method of claim 1, wherein the other network device includes a service orchestration device.

8. The method of claim 1, wherein the cost values are generated based on marginal costs pertaining to computational, storage, and networking.

9. A network device comprising:
   a communication interface; and
   a processor, wherein the processor is configured to:
   receive, via the communication interface, a request for a network service;
   select a portion of network resources of a network that would support the network service;
   calculate network resource information pertaining to the selected portion of network resources, wherein the network resource information indicates a cost to utilize the selected portion of network resources;
   generate end-to-end network slice deployment information that includes parameters to provision an end-to-end network slice deployment layout in the network that support the network service and cost values of a network slice service pertaining to an entity provisioning the network service;
   transmit, via the communication interface, the end-to-end network slice deployment information to an other network device.

10. The network device of claim 9, wherein the cost values are generated based on at least one of operational costs or maintenance costs of the network slice service.

11. The network device of claim 9, wherein the processor is further configured to:
    store network resource and capability information pertaining to network resources of the network and the network slice service.

12. The network device of claim 11, wherein the network resource and capability information indicates network resources that are available for use, available capacities of the network resources including computational, storage, and transport, and locations of the available network resources, and wherein the network resources include network devices and communication links.

13. The network device of claim 9, wherein the processor is further configured to:
    generate, based on the request, network level requirement information that would support the network service.

14. The network device of claim 13, wherein the processor is further configured to:
    select one or more network resources from the portion of the network resources that use a least capacity based on the network resource information and the network level requirement information; and
    include parameters pertaining to the one or more network resources in the end-to-end network slice deployment information.

15. The network device of claim 9, wherein the cost values are generated based on marginal costs pertaining to computational, storage, and networking.

16. A non-transitory computer-readable storage medium storing instructions executable by a processor of a network device, which when executed causes the network device to:
    receive a request for a network service;
    select a portion of network resources of a network that would support the network service;
    calculate network resource information pertaining to the selected portion of network resources, wherein the network resource information indicates a cost to utilize the selected portion of network resources;
    generate end-to-end network slice deployment information that includes parameters to provision an end-to-end network slice deployment layout in the network that support the network service and cost values of a network slice service pertaining to an entity provisioning the network service; and
    transmit the end-to-end network slice deployment information to an other network device.

17. The non-transitory computer-readable storage medium of claim 16, wherein the cost values are generated based on at least one of operational costs or maintenance costs of the network slice service.

18. The non-transitory computer-readable storage medium of claim 17, wherein the instructions further include instructions executable by the processor of the network device, which when executed causes the network device to:
   store network resource and capability information pertaining to network resources of the network and the network slice service.

19. The non-transitory computer-readable storage medium of claim 18, wherein the network resource and capability information indicates network resources that are available for use, available capacities of the network resources including computational, storage, and transport, and locations of the available network resources, and wherein the network resources include network devices and communication links.

20. The non-transitory computer-readable storage medium of claim 16, wherein the cost values are generated based on marginal costs pertaining to computational, storage, and networking.

\* \* \* \* \*